United States Patent [19]

Tholen et al.

[11] Patent Number: 4,989,944
[45] Date of Patent: Feb. 5, 1991

[54] METHOD AND DEVICE FOR MANUFACTURING A CONNECTOR PART FOR AN OPTICAL CONNECTOR

[75] Inventors: Antonius H. L. Tholen; Cornelis J. T. Potters; Antonius J. A. Nicia, all of Eindhoven, Netherlands

[73] Assignee: U.S. Philips Corp., New York, N.Y.

[21] Appl. No.: 875,417

[22] Filed: Jun. 17, 1986

[30] Foreign Application Priority Data

Jun. 21, 1985 [NL] Netherlands ............ 8501787

[51] Int. Cl.$^5$ .................................. G02B 6/32
[52] U.S. Cl. ...................... 350/96.18; 350/96.2
[58] Field of Search ............... 350/96.18, 96.19, 96.20

[56] References Cited

U.S. PATENT DOCUMENTS

| 4,265,511 | 5/1981 | Nicia et al. | 350/96.21 X |
| 4,451,115 | 5/1984 | Nicia et al. | 350/96.18 |
| 4,452,506 | 6/1984 | Reeve et al. | 350/96.15 X |

FOREIGN PATENT DOCUMENTS 2033104 5/1980 United Kingdom ............ 350/96.18

Primary Examiner—John D. Lee
Assistant Examiner—John Ngo
Attorney, Agent, or Firm—William L. Botjer

[57] ABSTRACT

A spherical lens (5) is fixed to the front end of a tubular housing (1) and an end part of a lightconducting fibre (9) is fixed with its first end face (11) in the focal plane of the lens. The line through the center (13) of the lens (5) and the middle of the first end face (11) is the optical axis (17). The housing (1) with the lens (5) is placed against a seat (25), which is formed as a cavity with a rotationally symmetrical surface, on whose axis of rotation (27) a light detector (31) is mounted. The detector is designed to determine deviations between the direction of a light beam coming from the lens and the direction of the axis of rotation. Near the second end face (45) of the fibre (9) light is injected into the fibre, and the rear end of the housing is displaced in two directions (x, y) perpendicular to the optical axis, until the light beam emerging from the lens (5) coincides with the axis of rotation (27). The lens (5) with the seating (25) thereby functions as a ball hinge. The outer surface of the housing (1) is now finish-machined with a tool (49) that rotates around the axis of rotation (27).

5 Claims, 1 Drawing Sheet

METHOD AND DEVICE FOR MANUFACTURING A CONNECTOR PART FOR AN OPTICAL CONNECTOR

BACKGROUND OF THE INVENTION

The invention relates to a method for manufacturing a connector part for an optical connector, in which a spherical lens is fixed to the front end of a tubular housing and an end part of a light-conducting fibre is fixed in the housing in such a way that a first end face of the fibre substantially coincides with the focal plane of the lens. The line which passes through the centre of the first end face plane and the centre of the lens is defined as the optical axis. The invention also relates to a device for implementing the method and to a connector part fabricated by the method.

A method of the aforesaid kind is known from U.S. Pat. No. 4,265,511 (PHN 9163). In accordance with the known method the end part of the light-conducting fibre is fixed in a tube which carries at one end the spherical lens that rests against a seat in the housing and forms a ball hinge with it. Near the other end of the tube the housing contains set screws by which this end can be displaced until the optical axis is parallel with the geometrical axis of the housing. This adjustment is visually checked by observing images projected on a screen, and the result is therefore dependent on the observer.

By means of a mechanical operation a reference face is formed on the housing which is accurately perpendicular to the geometrical axis. When two connector parts made by this method are arranged with their reference faces one against the other, it may be expected that their optical axes will be at least parallel, although it is not certain that they will also lie in each others extension. Since the means of adjustment are built into the housing, the number of components required for a connector part is relatively large, which makes the construction difficult and the price relatively high. Moreover, the result achieved depends on the observer.

SUMMARY OF THE INVENTION

It is an object of the invention to provide a method of the kind mentioned in the preamble whereby the housing can have a relatively simple construction and an objective check can be made on the coincidence of the optical axis and the geometrical axis. The method according to the invention is characterized in that, after the lens and the end part of the fibre have been fixed in the housing, the housing with the lens is placed against a seat which is formed as a cavity with a rotationally symmetrical surface, on whose axis of rotation a light detector is mounted. The detector is designed to determine deviations between the direction of a light beam coming from the lens and the direction of the axis of rotation. Near the second end face of the light-conducting fibre, light is injected into the fibre. The rear end of the housing is displaced in two directions perpendicular to the optical axis, the lens with the seat together functioning as a ball hinge. The displacement of the rear end of the housing is terminated when the light detector indicates that the direction of the light beam emerging from the lens coincides with the axis of rotation. Subsequently at least a part of the outer surface of the housing is subjected to a machining operation by means of a tool that rotates around the axis of rotation.

The method in accordance with the invention is based on the insight that the exact machining of the housing, for causing the optical and the geometrical axes to coincide, whereby the necessary means of adjustment can form part of the device for implementing the method, so that they have scarcely any influence on the price of the connector part. Moreover, by means of the light detector, an objective and reliable check can be made on the mutual positions of the two axes.

A device for implementing the method in accordance with the invention is characterized in that the seat is located at one end of a member having a cylindrical outer surface, whose cylindrical axis coincides with the axis of rotation, and having a axial bore which extends from the first end to the second end, the light detector being mounted opposite the said second end. A tool carrier having a cylindrical bore, whose inside diameter is substantially equal to the outer diameter of the member, is rotatable around the member. The tool carrier carries the tool for the machining operation, said tool being directed toward the axis of rotation in the vicinity of the first end of the member.

BRIEF DESCRIPTION OF THE DRAWING

The invention will now be explained in more detail with reference to the drawings, where.

DESCRIPTION OF THE PREFERRED EMBODIMENTS

Figure 1:
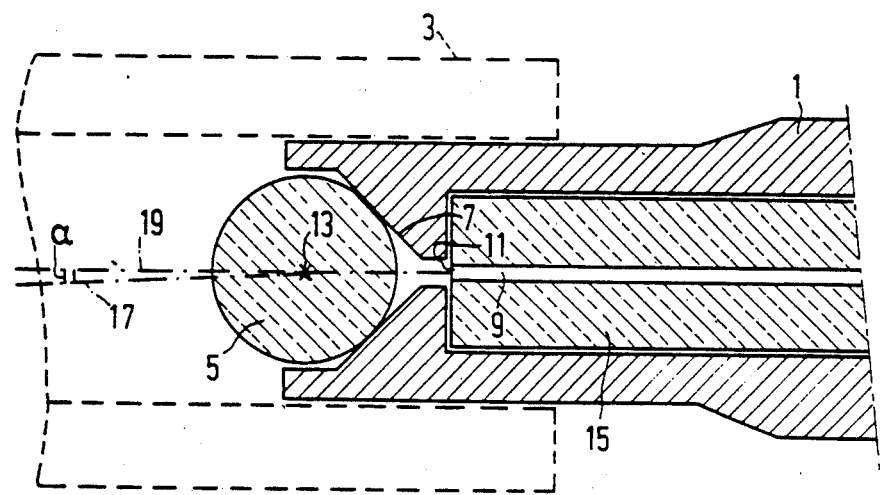
FIG. 1 shows a longitudinal section of a connector part before implementation of the method in accordance with the invention.

FIG. 1 shows a longitudinal section of the front portion of a connector part for an optical connector. The connector part comprises a tubular housing 1, whose front part (on the left in FIG. 1) has a cylindrical outer surface and is designed to be inserted from one side into a coupling bush 3 indicated schematically with dashed lines. From the other side a correspondingly formed connector part is inserted into the coupling bush 3 (not shown), so that the two connector parts together with the coupling bush form an optical connector.

To the front end of the housing 1 a spherical lens 5 is fixed in a conical enclosure 7, by means for example of a suitable adhesive. An end part of a light-conducting fibre 9 is fixed in the housing 1 in such a way that a first end face 11 of the fibre coincides with the focal plane of the lens 5.

To this end, in this embodiment the end part of the light-conducting fibre 9 is fixed with an adhesive in a small tube 15 with a capillary bore, which is inserted from the rear end into the housing 1 until the first end face 11 of the fibre is located at the focal distance of the lens 5. Next, the tube 15, which may be example by made of quartz or of glass, is fixed by means of an adhesive in the housing 1. It is also possible, if desire, to fix the end part of the fibre 9 in the housing in some other way, for example directly in a capillary bore formed in the housing 1 itself.

The line that goes through the centre of the first end face 11 of the fibre 9 and the centre 13 of the lens 5 is defined as the optical axis 17 (indicated by a dash-dotted line). The cylindrical outer surface of the front part of the housing 1 has a geometrical axis 19, also indicated with a dash-dotted line. Since the lens 5 is accurately spherical and the conical enclosure 7 in the cylindrical outer surface of housing 1 can be formed with relatively high precision in one operation on the same lathe, the centre 13 of the lens will in general be on or very close to the geometrical axis 19.

In most cases the geometrical axis 19, however, will make a small angle with the optical axis 17. This angle will in general be determined by the inevitable tolerances that are involved in fixing the end part of the fibre 9 in the housing 1. When two connector parts are connected to each other by means of the coupling bush 3, their geometrical axes 19 will therefore come to lie in each other's extension, while their optical axes 17 will make an angle with each other. This leads in many cases to intolerably large light losses, and it is therefore important to cause the geometrical and optical axes to coincide or at least to run parallel with each other at a very small mutual distance.

Figure 2:
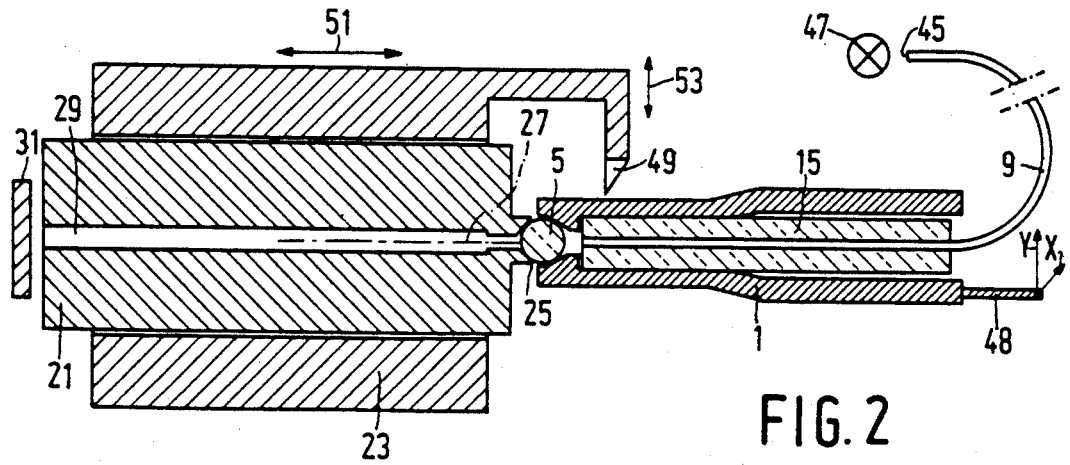
FIG. 2 shows a schematic longitudinal section of those components of an embodiment of a device for implementing the method in accordance with the invention that are of importance for understanding the invention.

For this purpose the connector part depicted in FIG. 1 can be finished by means of the device shown schematically in FIG. 2. This device comprises a member 21 with a cylindrical outer surface on which a tool carrier 23 is carried in bearings. Carrier 23 has a cylindrical inner surface whose diameter is substantially equal to the diameter of the outer surface of the member 21, so that the member forms a virtually clearance-free shaft for the tool carrier.

At the first end of the member 21 (on the right in FIG. 2) is located a seat 25 in which the lens 5 fits. This seat is formed as a cavity with a rotationally symmetric surface whose axis of rotation 27 (indicated by a dot-dashed line) coincides with the cylinder axis of the cylindrical outer surface of the member 21. In this embodiment the seat 25 has a conical surface, but other shapes, for example part of a spherical surface, are also possible.

In this member 21 an axial bore 29 is formed which extends from the seat 25 at the first end to the second end (on the left in FIG. 2). Opposite to this second end, at the location of the bore 29, a light detector 31 is mounted, which will now be described in further detail with reference to FIG. 3.

Figure 3:
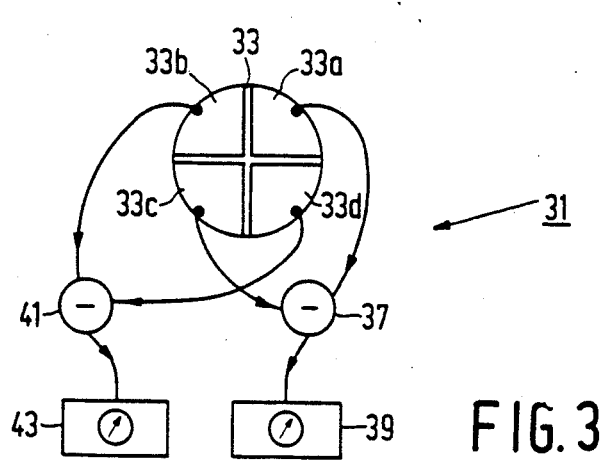
FIG. 3 shows a front view of an embodiment of a light detector used in the device according to FIG. 2.

The light detector 31 comprises a photosensitive quadrant cell 33, which has the form of a circle divided into four quadrants. Each quadrant consists of a photosensitive element, for example a photosensitive register. The elements are indicated in FIG. 3 by 33a, 33b, 33c and 33d.

The diametrically situated elements 33a and 33c are electrically connected to the inputs of a first subtraction circuit 37, whose output is connected to a first reading instrument 39. The two other, equally diametrically situated elements 33b and 33d are electrically connected to the inputs of a second subtraction circuit 41, whose output is connected to a second reading instrument 43.

When a light beam is directed with its axis exactly onto the middle of the quadrant cell 33, the diametrically situated elements receive the same amount of light, so that they produce an equally large electrical signal. The outputs of the two subtraction circuits 37, 41 then carry no signal, and the two reading instruments 39, 43 register zero. When the axis of the light beam does not pass through the middle of the quadrant 33, the different elements produce unequal signals, so that the reading instruments indicate values differing from zero.

FIG. 2 shows that the housing 1 of a connector part with the lens 5 can be placed against the seat 25, and that near the second end face 45 of the fibre 9 a light source 47 can be placed which radiates light into the fibre. This light is conducted through the fibre 9 to the lens 5 so that there emerges from the lens a parallel beam of light which is directed along the optical axis 17 as indicated in FIG. 1. This light beam arrives via the axial bore 29 at the light detector 31, which is mounted in such a way that the axis of rotation 27 passes through the centre of the quadrant cell 33.

When the light beam emerging from the lens 5 is directed exactly according to the axis of rotation 27, it will therefore impinge upon the quadrant cell 33 exactly in the middle, so that this will not produce any output signals. This is the case when the optical axis 17 of the connector part lies in the extension of the axis of rotation 27.

When these two axes 17 and 27 make an angle with each other, the light beam does not impinge on the quadrant cell in the middle, and the light detector produces output signals that differ from zero. In order to make the angle between the two axes 17 and 27 equal to zero, the rear end of the housing 1 can be displaced in two directions perpendicular to the optical axis 17, for example by means of a micromanipulator 48 (indicated schematically). The two directions of displacement are indicated by x and y. They should preferably be parallel to the connecting lines between the centres of the diametrically situated elements 33a and 33c, and 33b and 33d respectively. During the displacement of the rear end of the housing 1 the output signals of the light detector 31 are continuously monitored until the disappearance of these signals indicates that the two axes 17 and 27 lie in each others extension. It is also possible to supply the output signals to a control device that operates the micromanipulator 47 so that the adjustment can take place fully automatically.

When it has been found that the direction of the light beam emerging from the lens 5 coincides with the axis of rotation 27, the outer surface of the front part of the housing 1 is subjected to a machining operation by means of a tool 49 which, near the first end of the member 21, is fixed to the tool carrier 23 and is directed toward the axis of rotation 27. The tool 49 is for example a cutter which machines the outer surface of the front part of the housing to give it a cylindrical form, whose axis coincides with the axis around which the tool carrier 23 rotates. Since this axis coincides with the axis of rotation 27, which in its turn, thanks to the adjustment described in the foregoing, lies in the extension of the optical axis 17 of the connector part, the optical axis 17 and the geometrical axis 19 of the connector part coincide with each other after this operation.

The tool carrier 23 is brought into rotation during the machining operation by a motor by means of a known type of lathe drive (not shown). If the tool 49, as in the exemplary embodiment shown, is a cutter, the tool carrier 23 must also be displaceable in the axial direction relative to the member 21, as indicated by the arrow 51. This movement too can be brought about by means of the usual drive mechanism for lathes.

What is claimed is:

1. A method of manufacturing an optical fiber connector element, said method comprising the steps of:
providing a tubular housing having first and second opposite ends and a bore extending from the first end to the second end, said housing having an outer surface;

providing a spherical lens at the first end of the housing, said lens having a focal plane and a center;

providing an optical fiber having first and second opposite ends, said first fiber end having an end face, said end face having a center;

arranging the first fiber end in the bore of the housing with the fiber end face at the focal plane of the lens, the center of the end face and the center of the lens defining an optical axis;

providing alight detector having a central axis, said detector providing an electrical output signal indicating when light incident thereon is centered on the central axis;

arranging the center of the spherical lens on the central axis of the light detector while allowing the lens to rotate around its center;

illuminating the second end of the optical fiber so as to emit a beam of light from the first end of the fiber through the lens onto the detector;

displacing the second end of the housing so as to pivot the housing on the center of the lens;

monitoring the detector electrical output signal to determine when the light beam from the fiber is centered on the central axis of the detector;

fixing the position of the second end of the housing when the detector electrical output signal indicated that the light beam from the fiber is centered on the central axis;

rotating a tool around the central axis of the detector; and machining the outer surface of the housing with the tool to render such outer surface concentric with said central axis and thereby also concentric with the optical axis.

2. A device for manufacturing an optical fiber connector element, said connector element comprising:

a tubular housing having first and second opposite ends and a bore extending from the first end to the second end, said housing having an outer surface which has a rotational axis;

a spherical lens at the first end of the housing, said lens having a focal plane and a center; and an optical fiber having first and second opposite ends, said first fiber end having an end face, said end face having a center, the first fiber end being arranged in the bore of the housing with the fiber end face at the focal plane of the lens, the center of the end face and the center of the lens defining an optical axis;

said device comprising:

a detector housing having first and second opposite ends, a central axis extending there-between and a bore along such axis from the first to the second end, and a seat at said first end thereof having a surface which is rotationally symmetric about the central axis;

a light detector arranged on the central axis facing the second end of the detector housing, said detector providing an electrical output signal indicating when light incident thereon is centered on the central axis;

the spherical lens being arranged in contact with the surface of the seat of the detector housing with the center of the lens being on the central axis of the light detector, said seat allowing the lens to rotate around its center so that displacement of the second end of the tubular housing will pivot the housing on the center of the lens;

means for monitoring the detector electrical output signal to determine when a beam of light incident thereon originating from the fiber is centered on the central axis;

means for fixing the position of the second end of the housing when the detector output signal indicates that the beam of light from the fiber is centered on the central axis; and a tool arranged for rotation around the central axis of the detector housing for machining the outer surface of said housing to render it concentric with the central axis and thereby also concentric with the optical axis.

3. A device as claimed in claim 2, characterized in that the tool is displaceable in the direction of the central axis of the detector.

4. A device as claimed in claim 2, characterized in that the seat of the detector housing is conically-shaped.

5. A device as claimed in any one of claims 2 to 4 inclusive, characterized in that the light detector comprises a photosensitive quadrant cell.

* * * * *